United States Patent
Liu

(10) Patent No.: US 8,474,766 B2
(45) Date of Patent: Jul. 2, 2013

(54) HEIGHT ADJUSTMENT MECHANISM AND ASSEMBLY METHOD FOR ELECTRONIC DEVICE USING THE SAME

(75) Inventor: Zhi-Hua Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 123 days.

(21) Appl. No.: 13/083,709

(22) Filed: Apr. 11, 2011

(65) Prior Publication Data

US 2012/0074273 A1 Mar. 29, 2012

(30) Foreign Application Priority Data

Sep. 28, 2010 (CN) .......................... 2010 1 0294644

(51) Int. Cl.
*F16M 11/24* (2006.01)
(52) U.S. Cl.
USPC .................... 248/188.4; 411/546; 411/535
(58) Field of Classification Search
USPC ................ 248/188.4, 188.2; 411/107, 353, 411/999, 970, 546, 535, 432
See application file for complete search history.

(56) References Cited

U.S. PATENT DOCUMENTS

| | | | | |
|---|---|---|---|---|
| 3,461,769 A * | 8/1969 | Brosseit | | 411/385 |
| 4,057,985 A * | 11/1977 | Stahl | | 70/231 |
| 4,312,145 A * | 1/1982 | Lukavich | | 37/417 |
| 4,453,346 A * | 6/1984 | Powell et al. | | 49/404 |
| 4,975,014 A * | 12/1990 | Rufin et al. | | 411/385 |
| 5,836,625 A * | 11/1998 | Kibble | | 292/145 |
| 6,357,953 B1 * | 3/2002 | Ballantyne | | 403/43 |
| 6,585,447 B2 * | 7/2003 | Schwarzbich | | 403/374.3 |
| 6,789,993 B2 * | 9/2004 | Ozawa et al. | | 411/546 |
| 7,019,979 B2 * | 3/2006 | Wang et al. | | 361/719 |
| 7,342,796 B2 * | 3/2008 | Aukzemas | | 361/719 |
| 7,468,889 B2 * | 12/2008 | Su | | 361/719 |
| 7,484,700 B2 * | 2/2009 | Selle | | 248/188.4 |
| 7,488,135 B2 * | 2/2009 | Hasegawa | | 403/48 |
| 7,506,674 B2 * | 3/2009 | Biller et al. | | 144/176 |
| 7,606,032 B2 * | 10/2009 | Lin | | 361/709 |
| 7,619,890 B2 * | 11/2009 | Tseng et al. | | 361/700 |
| 8,167,013 B2 * | 5/2012 | D'Ignazio et al. | | 144/359 |
| 8,197,168 B2 * | 6/2012 | Liu | | 411/107 |
| 8,202,033 B2 * | 6/2012 | Choi et al. | | 411/546 |
| 8,267,630 B2 * | 9/2012 | Moon et al. | | 411/338 |
| 2002/0176739 A1 * | 11/2002 | Goto et al. | | 403/301 |
| 2003/0068210 A1 * | 4/2003 | Pountney | | 411/384 |
| 2007/0207012 A1 * | 9/2007 | Lorenzo | | 411/546 |

* cited by examiner

*Primary Examiner* — Terrell McKinnon
*Assistant Examiner* — Daniel J Breslin
(74) *Attorney, Agent, or Firm* — Altis Law Group, Inc.

(57) ABSTRACT

A height adjustment mechanism includes a fixing member, an adjustment member rotatably engaging with the fixing member, and a standard member having a standard surface. The adjustment member defines an engaging hole. The standard member defines an alignment hole through the standard surface corresponding to the engaging hole of the adjustment member. The standard member is separately positioned over the adjustment member, and the standard surface of the standard member contacts with one distal end of the adjustment member. An assembly method for an electronic device is also provided.

5 Claims, 8 Drawing Sheets

HEIGHT ADJUSTMENT MECHANISM AND ASSEMBLY METHOD FOR ELECTRONIC DEVICE USING THE SAME

BACKGROUND

1. Technical Field

The present disclosure relates to adjustment mechanisms, and particularly, to a height adjustment mechanism and assembly method for an electronic device using the height adjustment mechanism.

2. Description of Related Art

Many electronic devices include a back cover and a front cover detachably assembled to the back cover. The back cover defines a plurality of mounting portions. During manufacturing, the back cover is made or formed by a stretching or bending process that does not ensure great amount of precision, thus, the back cover may not be very flat. In addition, imprecise manufacturing methods may result in the mounting portions not being level with each other, making assembly of the front cover to the back cover difficult, and would even result in a poor fit.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the height adjustment mechanism and assembly method for electronic device using the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
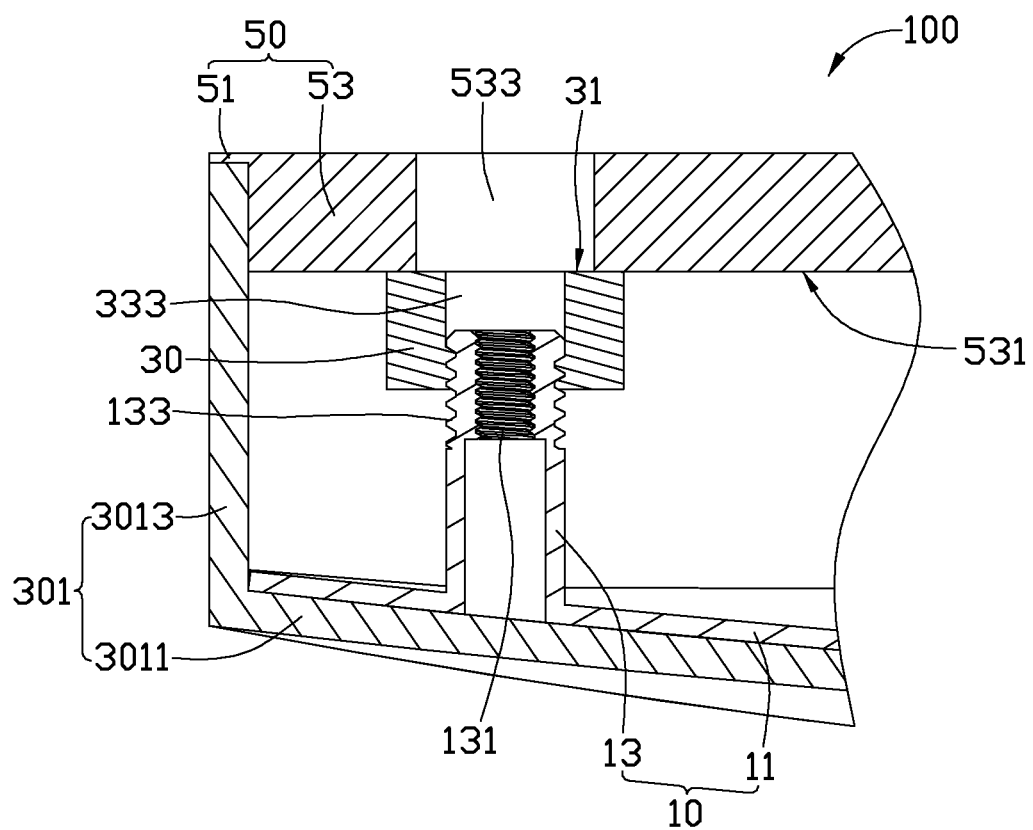
FIG. 1 shows a partial, cross sectional view of an embodiment of a height adjustment mechanism, the adjustment mechanism including a fixing member, an adjustment member, and a standard member.

Referring to FIG. 1, an embodiment of a height adjustment mechanism 100 includes a fixing member 10, an adjustment member 30 rotatably engaging the fixing member 10, and a standard member 50. The standard member 50 is separately positioned over and contacts the adjustment member 30.

The fixing member 10 includes a fixing portion 11 and a sleeve portion 13 formed on the fixing portion 11. The fixing portion 11 is substantially board shaped. The sleeve portion 13 is substantially a hollow cylinder and protrudes from the fixing portion 11. The sleeve portion 13 axially defines a connecting hole 131. An outer screw thread 133 is formed at a distal end of the sleeve portion 13 away from the fixing portion 11. In the illustrated embodiment, the sleeve portion 13 forms an acute angle with the fixing portion 11 on one side, namely the sleeve portion 13 is not disposed perpendicular to the fixing portion 11. The connecting hole 131 of the sleeve portion 13 is internally threaded. It is to be understood that the fixing portion 11 can also be a block or frame, and the connecting hole 131 can be an unthreaded hole.

Figure 2:
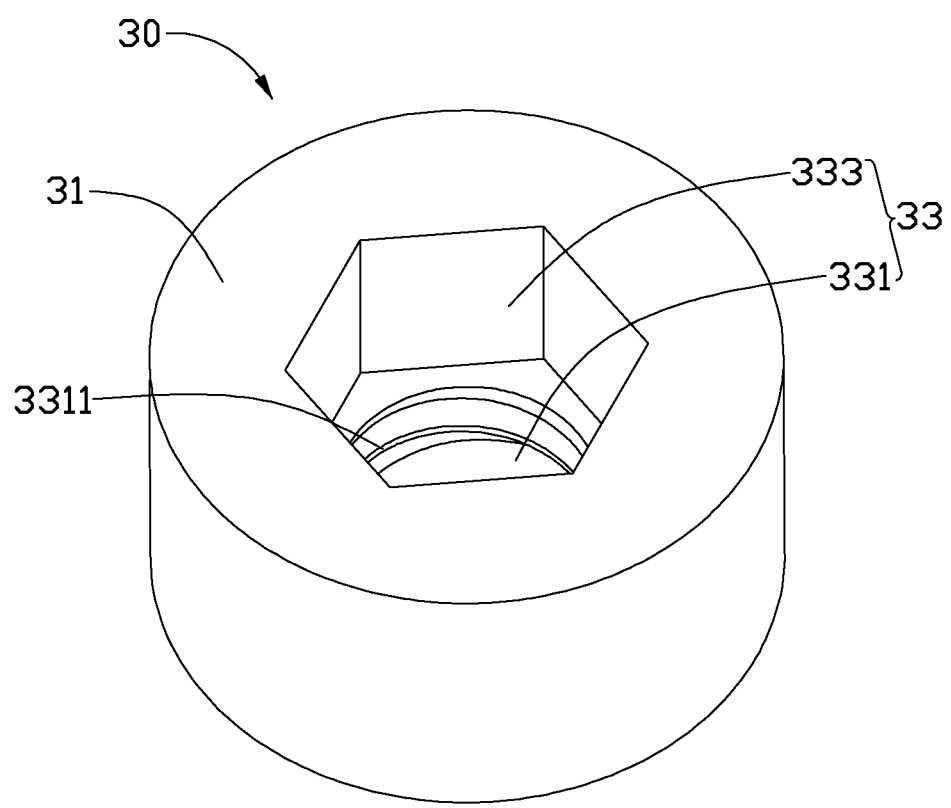
FIG. 2 shows an isometric view of a first embodiment of the adjustment member of FIG. 1.

Also referring to FIG. 2, the adjustment member 30 has a contact surface 31 and axially defines a stepped engaging hole 33 therethrough. The engaging hole 33 includes a first hole section 331 and a second hole section 333 coaxially connecting with the first hole section 331. The first hole section 331 defines an inner screw thread 3311 corresponding to the outer screw thread 133 of the sleeve portion 13. The second hole section 333 is a non-circular hole. In the illustrated embodiment, the second hole section 333 is a regular hexagonal hole.

Figure 3:
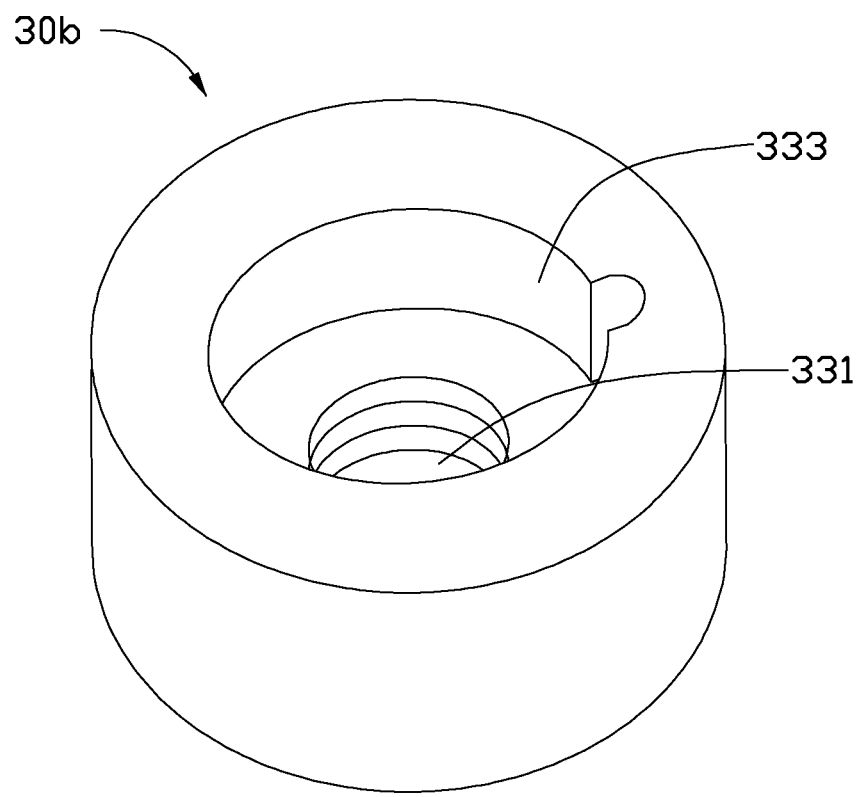
FIG. 3 shows an isometric view of a second embodiment of an adjustment member.
Figure 4:
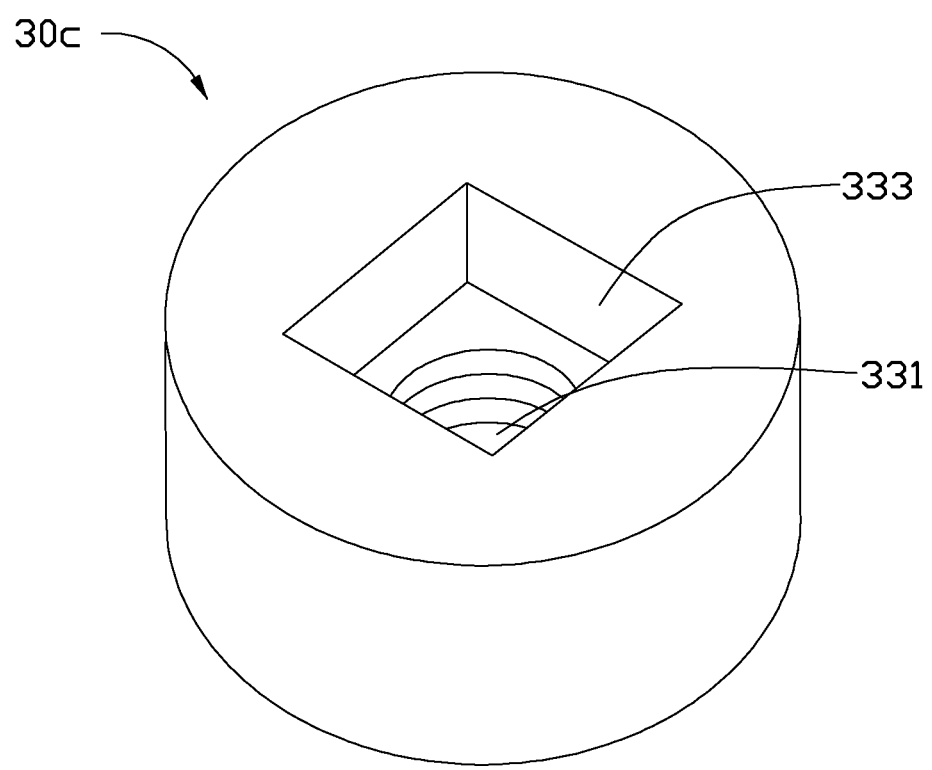
FIG. 4 shows an isometric view of a third embodiment of an adjustment member.

Also referring to FIGS. 3 and 4, an isometric view of a second embodiment of an adjustment member 30b and an isometric view of a third embodiment of an adjustment member 30c are shown, respectively. In FIG. 3, the second hole section 333 is formed by a circular hole with a slot communicating with the circular hole. In FIG. 4, the second hole section 333 is a square hole.

The standard member 50 includes a base body 53 and a supporting portion 51 formed at a periphery of the base body 53. The base body 53 defines a standard surface 531 and further defines an alignment hole 533 through the standard surface 531 corresponding to the adjustment member 30.

Figure 5:
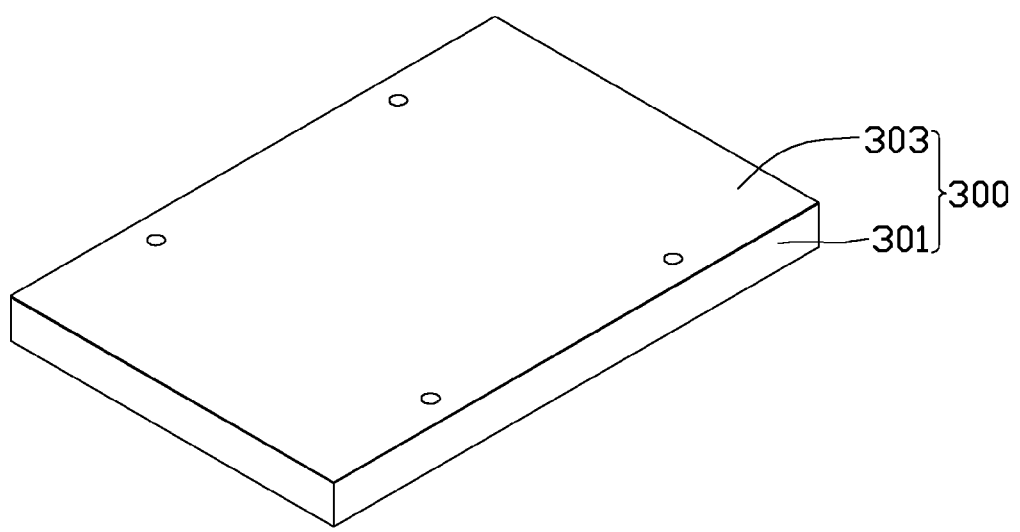
FIG. 5 shows an isometric view of an embodiment of an electronic device assembled using the height adjustment mechanism.
Figure 6:
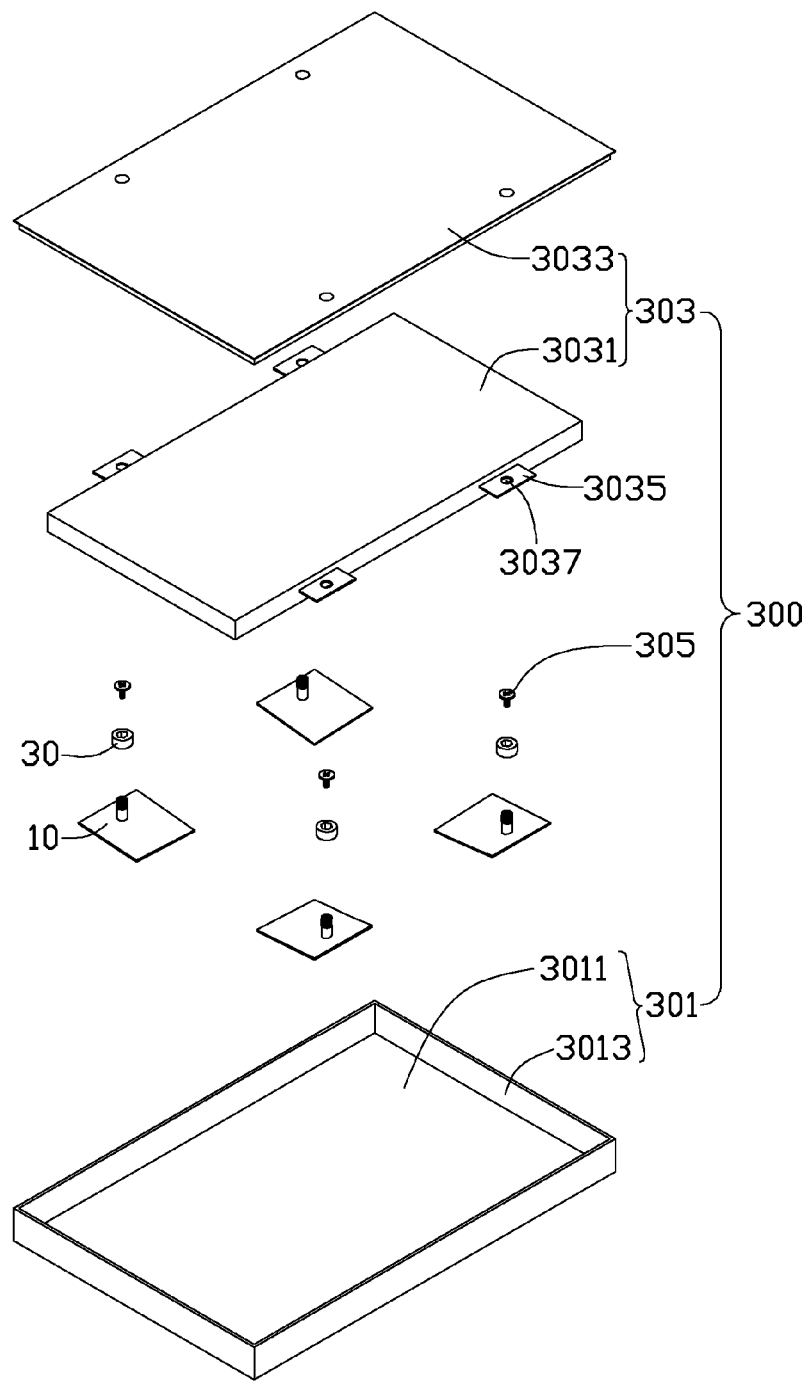
FIG. 6 shows an exploded, isometric view of the electronic device and some of the components of the height adjustment mechanism.

Also referring to FIGS. 5 and 6, an electronic device 300 assembled using the height adjustment mechanism 100 includes a back cover 301, a front cover 303 assembled to the back cover 301, and a plurality of fasteners 305. The back cover 301 includes a bottom wall 3011 and a supporting wall 3013 extending from a periphery of the bottom wall 3011.

The front cover 303 includes a liquid crystal display 3031 and a protecting glass 3033 covering the liquid crystal display 3031. A plurality of connecting portions 3035 are formed at a periphery of the liquid crystal display 3031. The connecting portion 3035 is substantially sheet shaped and extends out from the periphery of the liquid crystal display 3031. Each connecting portion 3035 defines a mounting hole 3037. In the illustrated embodiment, there are four connecting portions 3035 symmetrically formed at two sides of the liquid crystal display 3031.

The fastener 305 is configured for fixing the front cover 303 to the back cover 301. In the illustrated embodiment, the fastener 305 is a bolt, and there are four fasteners 305, corresponding to the number of the connecting portions 3035. It is to be understood that, the fastener 305 could also be a rivet; correspondingly, the connecting hole 131 would be an unthreaded hole.

Figure 7:
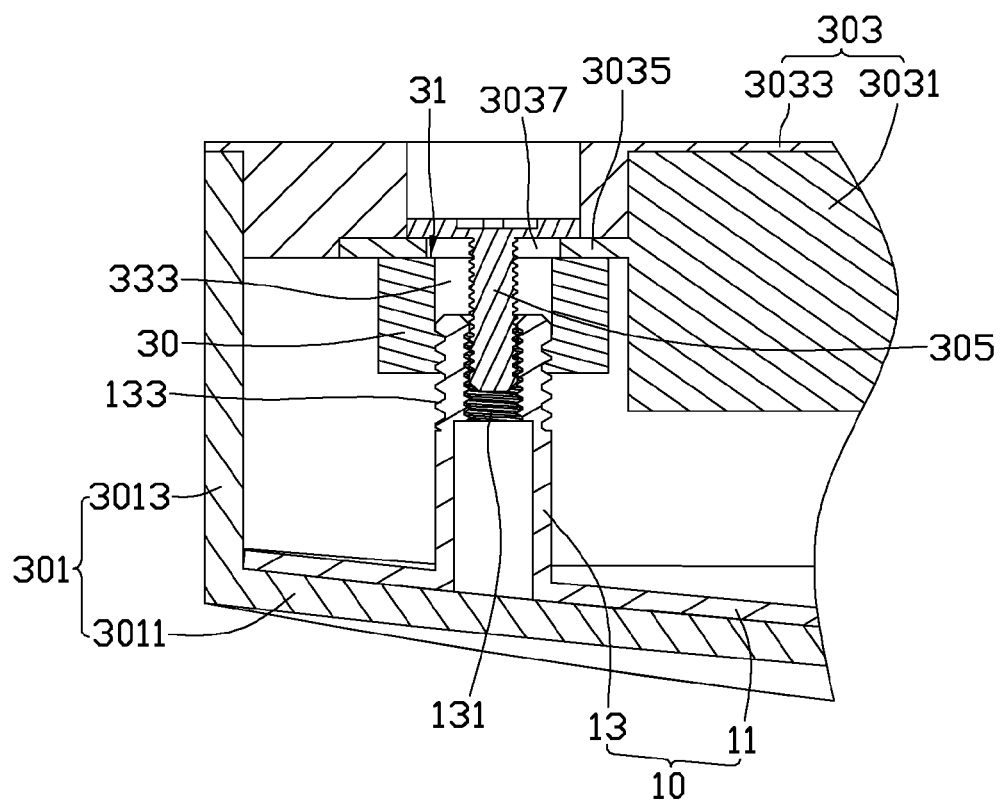
FIG. 7 shows a partial, cross sectional view of an embodiment of the height adjustment mechanism used in the electronic device.
Figure 8:
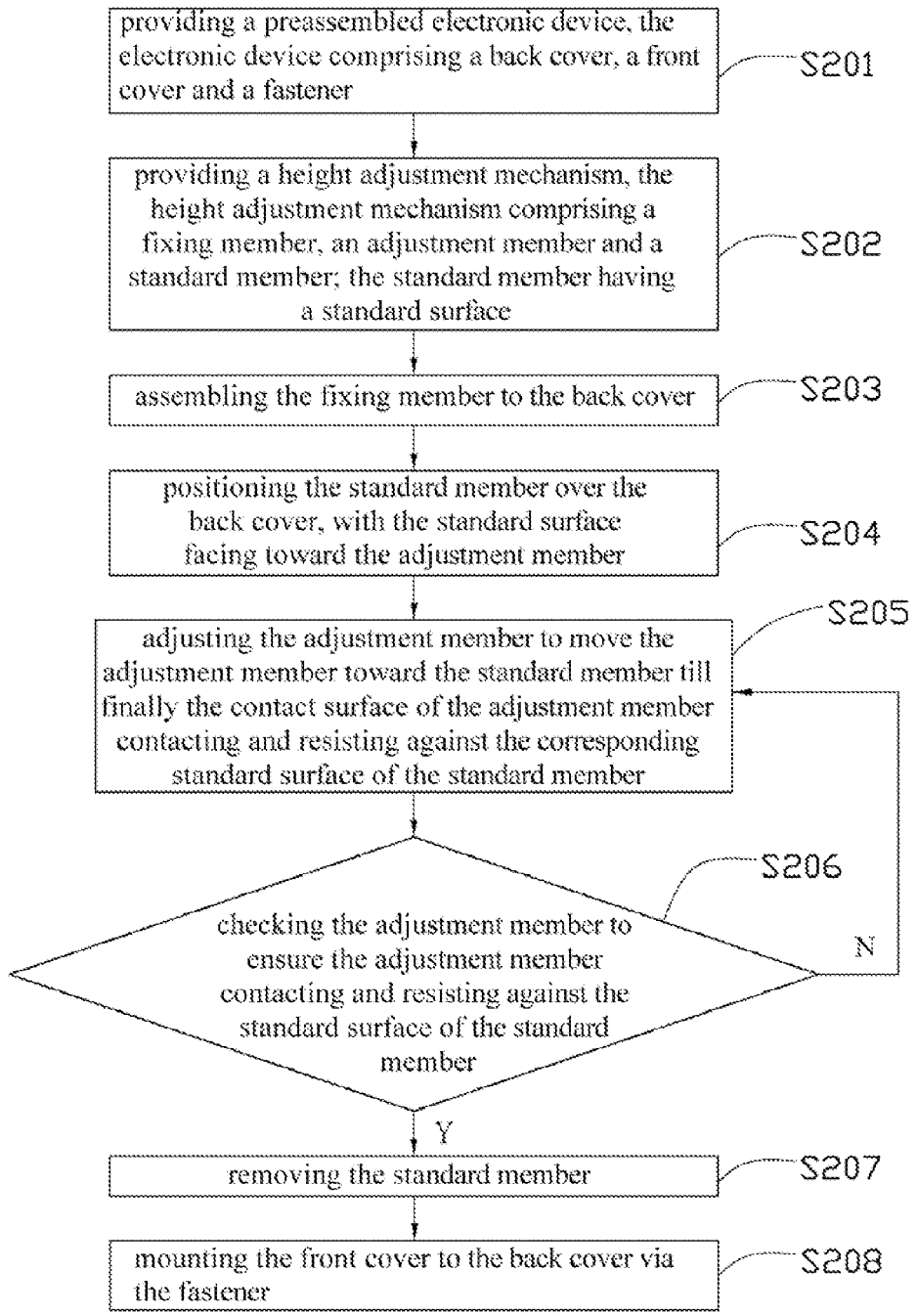
FIG. 8 shows a flow chart of an assembly method of the electronic device using the height adjustment mechanism.

Referring to FIGS. 1, 7, and 8, a method for assembling the electronic device 300 using the height adjustment mechanism 100 includes the following steps.

In step S201: a preassembled electronic device 300 is provided, wherein, the electronic device 300 includes a back cover 301, a front cover 303, and a plurality of fasteners 305.

In step S202: a height adjustment mechanism 100 is provided, wherein, the height adjustment mechanism 100 includes a fixing member 10, an adjustment member 30, and a standard member 50.

In step S203: the fixing member 10 is fixedly assembled to the back cover 301. In the illustrated embodiment, the fixing portion 11 is adhered or welded to the bottom wall 3011 of the back cover 301.

In step S204: the standard member 50 is positioned over the back cover 301, with the supporting portion 51 contacting and supporting the corresponding supporting wall 3013, and the standard surface 531 of the standard member 50 is faced toward the adjustment member 30.

In step S205: the adjustment member 30 may be adjusted using a tool such as a hexagonal wrench. In the illustrated embodiment, one end of the wrench is engaged in the engaging hole 33, and the adjustment member 30 is rotated so that it moves toward the standard member 50 until finally the contact surface 31 contacts and resists against the corresponding standard surface 531.

In step S206: the adjustment member 30 is double-checked to ensure the adjustment member 30 is contacting and resisting against the standard surface 531.

In step S207: removing the standard member 50 under the condition that the adjustment member 30 is satisfactorily contacting and resisting against the standard surface 531, otherwise, repeat step S205.

In step S208: the front cover 303 is mounted to the back cover 301, the connecting portions 3035 of the liquid crystal display 3031 of the front cover 303 are respectively aligned with the corresponding adjustment members 30, and the fasteners 305 are respectively extended through the mounting holes 3037 and engaged into the corresponding connecting holes 131. Then, the connecting portion 3035 is fixed to the fixing member 10 to finish the assembly of the electronic device 300.

It is to be understood that the fastener 305 could be omitted, correspondingly, the connecting holes 131 of the fixing members 10 could also be omitted. Then, the connecting portion 3035 of the front cover 303 is welded or adhered to the contact surface 31 of the adjustment member 30 directly.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A height adjustment mechanism, comprising:
    a fixing member comprising a fixing portion and a sleeve portion formed an acute angle on the fixing portion on one side, the sleeve portion axially defining a connecting hole, the connecting hole being a threaded hole, and an outer screw thread formed at a distal end of the sleeve portion away from the fixing portion;
    an adjustment member defining an engaging hole comprising a first hole section and an inner screw thread formed in the first hole section for engaging with the outer screw thread of the fixing member; and
    a standard member having a standard surface and defining an alignment hole through the standard surface corresponding to the engaging hole of the adjustment member, the standard member being separately positioned over the adjustment member, and the standard surface of the standard member contacting with one distal end of the adjustment member.

2. The height adjustment mechanism of claim 1, wherein the engaging hole is substantially stepped shaped and further comprises a second hole section, the second hole section is non-circular and coaxially connecting with the first hole section.

3. The height adjustment mechanism of claim 1, wherein the adjustment member has a contact surface, the engaging hole is substantially stepped shaped defined through the contact surface axially; the engaging hole further comprises a second hole section, and the second hole section is non-circular and coaxially connecting with the first hole section.

4. The height adjustment mechanism of claim 3, wherein the second hole section is a regular hexagonal hole.

5. The height adjustment mechanism of claim 3, wherein the standard member includes a base body and a supporting portion formed at a periphery of the base body, and the standard surface is defined on the base body.

* * * * *